United States Patent [19]

Dudley

[11] 4,020,028

[45] Apr. 26, 1977

[54] PROCESS AND BATH COMPOSITION FOR INCREASING THE RATE OF POLYMER DEPOSITION IN ELECTROCOATING

[75] Inventor: Michael Alan Dudley, Beaconsfield, Canada

[73] Assignee: Canada Wire and Cable Limited, Toronto, Canada

[22] Filed: Jan. 2, 1974

[21] Appl. No.: 429,771

[30] Foreign Application Priority Data

Dec. 29, 1972 Canada ............................... 160228

[52] U.S. Cl. ........................... 260/18 EP; 204/181; 260/22 EP; 260/23 EP; 260/29.2 EP; 260/29.6 E; 260/29.6 ME; 260/29.7 SE; 260/33.4 EP; 260/33.4 PQ

[51] Int. Cl.² .......................................... C08J 3/20

[58] Field of Search ................ 204/181; 260/18 EP, 260/29.2 EP, 29.6 E, 29.6 ME, 33.4 EP, 33.4 PQ, 29.7 SE, 22 EP

[56] References Cited

UNITED STATES PATENTS

| | | | |
|---|---|---|---|
| 3,245,937 | 4/1966 | Wagner | 260/29.6 ME |
| 3,297,619 | 1/1967 | Bluhm et al. | 260/29.6 E |
| 3,377,175 | 4/1968 | Wolf et al. | 260/29.6 ME |
| 3,506,601 | 4/1970 | Sekmakas | 260/29.6 E |
| 3,535,249 | 10/1970 | Larson | 260/29.6 ME |
| 3,598,775 | 8/1971 | Huggard | 260/18 EP |
| 3,666,649 | 5/1972 | Sekmakas et al. | 204/181 |
| 3,705,866 | 12/1972 | Shibata et al. | 204/181 |
| 3,772,227 | 11/1973 | Kapalko et al. | 260/29.6 ME |
| 3,796,770 | 3/1974 | Daimer et al. | 204/181 |
| 3,798,194 | 3/1974 | McCann et al. | 260/29.6 E |
| 3,819,548 | 6/1974 | Beck et al. | 260/29.6 ME |
| 3,839,252 | 10/1974 | Bosso et al. | 260/29.2 EP |
| 3,843,583 | 10/1974 | Gibbs et al. | 260/29.6 E |
| 3,855,106 | 12/1974 | Campbell et al. | 204/181 |
| 3,862,916 | 1/1975 | Hayworth | 260/29.6 E |

FOREIGN PATENTS OR APPLICATIONS

| | | | |
|---|---|---|---|
| 545,587 | 8/1956 | Belgium | 260/29.6 E |
| 1,769,545 | 9/1971 | Germany | |
| 1,131,705 | 10/1968 | United Kingdom | |

*Primary Examiner*—Eugene C. Rzucidlo
*Attorney, Agent, or Firm*—Fleit & Jacobson

[57] ABSTRACT

There is provided an electrocoating bath composition for depositing a coat of polymer material onto an anode. This bath composition comprises an essentially aqueous solution, emulsion or dispersion of the polymer and 0.01 to 2.0% by weight with reference to the bath composition of a compound of one of the general formulae:

$$X - R - X' \text{ or } R' - X - R - X'$$

wherein

R and R' are each an organic radical,

X is one of the following groups $-SH$, $-OH$ (phenolic or enolic), $=NH$, $-NH.H$, and X' is a hydrogen atom or X, the groups X being in such electronic configuration with reference to the organic radical R or the organic radicals R and R' that there is always a presence of labile protons therein under operative conditions of the electrocoating bath, or of a salt of said compound, and the compound or its salt being in an at least partially disassociated state in the electrocoating bath composition and capable of proton association in close vicinity of the anode under conditions of operation. When the electrocoating process is carried out in such bath, be it batchwise or continuously, an increased rate of polymer deposition onto the anode is achieved.

16 Claims, No Drawings

PROCESS AND BATH COMPOSITION FOR INCREASING THE RATE OF POLYMER DEPOSITION IN ELECTROCOATING

This invention relates to an improved electrocoating process and electrocoating bath composition which provide for an increased rate of polymer deposition onto an anode.

Many electrocoating processes and bath compositions are known in the art. The present invention is concerned with those wherein a polymer which is dissolved or dispersed in an essentially aqueous electrocoating bath is deposited on a conducting substrate, acting as anode, during the electrocoating operation which can be performed batchwise or continuously.

Electrocoating or electrophoretic processes whereby a polymer or a resin is applied to metallic objects in an electrocoating bath, by passage of an electric current through such bath, have become common practice in a number of industries. For example, paint is applied to automobiles in such a way and electric wires or metallic strips are coated in a continuous process to provide them with a layer of insulation or a protecting polymeric film. In most instances, the object to be coated acts as an anode while being immersed into the bath and the walls of the bath container may act as cathode. Alternatively, suitable cathodes may be provided within the bath.

When the coated object is removed from the bath, the polymer or resin is cured thereon into a durable film by drying or heating, preferably in a suitable oven.

A number of bath compositions are known in the art and they are all used to improve in some way either the electrocoating process or the obtained coated product.

The object of the present invention is to provide a novel electrocoating bath composition for depositing a coat of polymer material onto an anode from an essentially aqueous solution, emulsion or dispersion of said polymer at an increased rate.

Another object of the present invention is to provide an electrocoating process which will achieve an increased rate of polymer deposition onto the conductive anodic substrate, such as aluminum, copper or steel, when the electrocoating operation is carried out in the bath of the present invention.

Other objects and advantages of this invention will be apparent from the following more detailed description.

Thus, this invention provides an electrocoating bath composition for depositing a coat of polymer material onto an anode, said bath composition comprising an essentially aqueous solution, dispersion or emulsion of said polymer, suitable for electrodeposition on the anode when an electric current is passed therethrough, and comprising 0.01 to 2.0% by weight with reference to said solution of a compound of one of the general formulae:

X - R - X' or R' - X - R - X' wherein R and R' are each an organic radical which may be either acyclic or cyclic. Illustrative acyclic radicals are straight chain saturated or unsaturated radicals preferably containing from 1 to 12 carbon atoms and from 0 to 3 heteroatoms such as oxygen. The cyclic radicals may be saturated or unsaturated carbocyclic or heterocyclic and may comprise fused heterocyclic rings, fused carbocyclic rings, and fused carbocyclic and heterocyclic rings, and carbocyclic and heterocyclic rings linked together through a ring atom or an acyclic saturated or unsaturated radical containing from 0 to 5 carbon atoms and from 0 to 5 heteroatoms such as nitrogen. Illustrative carbocyclic radicals are aromatic hydrocarbon radicals preferably containing one C ring such as phenylene. Illustrative heterocyclic radicals are radicals containing 5 to 9 ring atoms including heteroatoms such as N, Se and S. In the case of heterocyclic radicals containing carbocyclic rings, the carbocyclic ring is preferably an aromatic hydrocarbon ring containing one C ring and the heterocyclic ring is preferably a 5 or 6 member ring containing heteroatoms such as N, Se and S. Illustrative 5 and 6 member heterocyclic rings are 1, 3, 4 thiadiazole and pyrimidene respectively. The heterocyclic radicals and rings mentioned above may be formed by R taken together with X when X is =NH.

X is one of the following groups: —SH, —OH (phenolic or enolic), =NH, —NH.H, and X' is a hydrogen atom or X, said groups X being in such electronic configuration with reference to the organic radical R or the organic radicals R and R' that there is always a presence of labile protons therein under operative conditions of the electrocoating bath, or of a salt of said compound, said compound or its salt being in an at least partially disassociated state in said electrocoating bath composition. The disassociated portion of the compound or its salt is capable of proton association in close vicinity of the anode of the electrocoating cell in which the electrocoating composition is contained, under conditions of operation.

It is considered highly unobvious that compounds of the above formula or salts thereof which are partially or totally disassociated in the electrocoating bath, produce a noticeable and in many instances a substantial increase of polymer deposition from electrocoating compositions when used in proportions between 0.01 to 2.0% by weight. It will be appreciated that these proportions can be very small in comparison with the total bath and in spite of this, they produce the desired increase in the rate of polymer deposition. The preferred proportion of this additive is between 0.3 and 0.5% by weight with reference to the total bath composition.

The polymer compositions employed are usually dilute essentially aqueous solutions, emulsions or dispersions which will normally have between about 5 and 15% by weight of the polymer therein. The polymer must, of course, be an electrodepositable polymer and there are many of these known in the art. Synthetic polycarboxylic acid resins are such polymers. Particularly, carboxylated epoxy ester resins, carboxylated acrylic resins, carboxylated alkyd resins, will all be quite acceptable within the scope of this invention. Also suitable are carboxylated styrene-acrylate resins and carboxylated butadiene resins. Other illustrative polymers are the electrodepositable trimellitic anhydride polyester resins such as XWE904 produced by Schenectady Chemicals.

In addition, the bath in accordance with this invention may contain other additives known in the art, which may be used for various purposes as already mentioned above. For instance, it may contain an additive which will improve edge and corner coverage, such as a water soluble phenolic resin; it may comprise cosolvents, flow control additives, anti-skinning additives, cross-linking agents and the like.

Basically, it is believed that the principle of operation of the compounds used in accordance with this invention depends on the fact that they exist in a partially or totally disassociated state at the pH of the electrocoating bath composition, while being essentially associated at the lower pH which prevails in the immediate vicinity of the anode during operation of the electrocoating cell. Thus, on energization of the cell, the additive compound migrates to the anode onto which the polymer will deposit and because of the lower pH surrounding the anode, it associates with hydrogen ions present and subsequently diffuses out to a region where it redissociates. By this action the additive prevents the total association of ions on each polymer molecule migrating to the anode, which allows a higher conductivity to be maintained between the electrodes and hence a higher polymer deposition rate occurs.

Although the applicant believes that the above theoretical explanation is correct, it does not wish to be restricted thereby.

The following list shows examples of the compounds which are suitable additives in accordance with this invention:

2-mercaptobenzimidazole;
2-mercaptobenzoxazole;
2,5-dimercapto-1,3,4-thiadiazole;
benzotriazole;
3-mercapto-1,2-propanediol;
2-mercapto-benzoselenazole;
benzimidazole;
ethyl-2-mercaptoacetate;
phenol;
1-phenyl-2-thiourea;
5,5'-dimethyl hydantoin;
1,4-diphenyl-3-thiosemicarbazide;
2-amino-5-methyl-1,3,4-thiadiazole;
N-phenyl thioglycolicacidamide;
3-amino-5-mercapto-1,2,4-triazole;
2,2'-dipyridylamine;
benzenethiol;
acetyl acetone;
phloroglucinol;
5-amino-1,3,4-thiadiazole-2-thiol;
2,6-dimercaptopurine;
2-mercaptopyrimidene;
ethyleneglycol bis mercaptoacetate;
1H, 1,2,4-triazole-3-thiol;
5-mercapto-3-phenyl-1,3,4-thiadiazole-2-thione;
dipotassium salt of 2,5-dimercapto-1,3,4-thiadiazole;
sodium salt of 2-mercaptobenzoxazole.

It will be noted that this invention also includes salts of the various compounds so long as they are at least partially dissociated in the electrocoating bath composition and capable of proton association in close vicinity of the anode under conditions of operation. It is also interesting to note that similar compounds such as piperazine and thiourea have no effect on the rate of polymer deposition in accordance with this invention. This is due to the fact that these compounds do not possess labile protons within their electronic configuration under operative conditions and do not undergo the required dissociation/association reactions at the pH values which exist in normal electrocoating processes.

The invention will now be described with reference to the following non-limitative examples:

EXAMPLE 1

A 14% epoxy ester electrocoating composition in accordance with U.S. Pat. No. 3,736,276, having a pH of about 8 has been prepared and 0.2% by weight of an additive from the group listed in the following Table, with reference to the bath composition, was dissolved therein. Preweighed strips of 0.002 in. aluminum foil were immersed to a predetermined depth in the electrocoating composition and at a predetermined distance from the cathode, and electrocoated for 7 sec. at 180 V. Each strip was then rinsed, cured for 40 minutes at 200° C., and reweighed after cooling. Two strips were coated for each additive and the average weight increase compared to an average of four control depositions carried out in the same bath but without the additive. The following Table I gives the names and formulae of the additives and the percent weight increase over the controls for each additive.

TABLE I

| Compound Name of Additive | Formula | % Increase |
|---|---|---|
| 3-mercapto-1,2-propanediol | $HOCH_2CH(OH)CH_2SH$ | 5.3 |
| 2-mercapto-benzoselenazole | benzoselenazole with C—SH | 5.8 |
| benzotriazole | benzotriazole structure | 9.5 |
| benzimidazole | benzimidazole structure | 11.0 |
| ethyl-2-mercaptoacetate | $CH_3CH_2OCCH_2SH$ with $\|\|$ O | 16.9 |

TABLE I-continued

WEIGHT INCREASES CAUSED BY VARIOUS ADDITIVES TO THE EPOXY/ESTER SYSTEM

| Compound Name of Additive | Formula | % Increase |
|---|---|---|
| phenol | C₆H₅OH | 21.5 |
| 1-phenyl-2-thiourea | C₆H₅NHC(=S)NH₂ | 22.7 |
| 5,5'-dimethyl hydantoin | (dimethyl hydantoin ring) | 29.0 |
| 1,4-diphenyl-3-thiosemicarbazide | C₆H₅NHNHC(=S)NHC₆H₅ | 32.4 |
| 2-amino-5-methyl-1,3,4-thiadiazole | (H₂N-C=N-N=C-CH₃ with S) | 33.4 |
| N-phenyl thioglycolicacidamide | C₆H₅NHC(=O)CH₂SH | 34.8 |
| 2-mercaptobenzoxazole | (benzoxazole-2-thiol) | 40.1 |
| 3-amino-5-mercapto-1,2,4 triazole | (H₂N-C=N-N(H)-C-SH=N) | 59.4 |
| 2,2'-dipyridylamine | (2-Py)NH(2-Py) | 60.5 |
| benzenethiol | C₆H₅SH | 61.3 |
| acetyl acetone | CH₃C(=O)CH₂C(=O)CH₃ | 70.6 |
| phloroglucinol | 1,3,5-(HO)₃C₆H₃ | 87.5 |
| 5-amino-1,3,4-thiadiazole-2-thiol | (H₂N-C=N-N=C-SH with S) | 211.3 |
| 2,6-dimercaptopurine | (purine with SH at 2 and 6) | 224 |

TABLE I-continued

WEIGHT INCREASES CAUSED BY VARIOUS ADDITIVES TO THE EPOXY/ESTER SYSTEM

| Compound Name of Additive | Formula | % Increase |
|---|---|---|
| 2-mercaptopyrimidene | (pyrimidine ring with SH) | 228 |
| ethyleneglycol bis mercaptoacetate | $(CH_2OCCH_2SH)_2$ with C=O | 251 |
| 1H 1,2,4-triazole-3-thiol | (triazole ring with SH) | 262 |
| 5-mercapto-3-phenyl-1,3,4-thiadiazole-2-thione | (phenyl-thiadiazole structure with SH) | 265 |

Other experiments have been carried out both on aluminum and copper substrates, batchwise and continuously, with varying concentrations of the additives. It has been found that concentrations as low as 0.01% by weight have produced some increase in the rate of polymer deposition, but that concentrations above 2.0% are not practical. Thus, although it would, of course, be possible to use concentrations above the upper limit of 2.0%, this is not desirable and it is believed that these compounds, particularly in excess of 5.0% by weight, would produce no further marked improvement in the rate of polymer deposition.

It has also been found that particularly preferred proportions are between 0.3 and 0.5%.

EXAMPLE 2

The procedure of Example 1 was repeated on a selected number of compounds using the additives at 0.2% and 0.4% concentration levels. The percent weight increase over control samples electrocoated at similar times and voltages, and percent increase between the use of 0.2% and 0.4% additive are summarized in Table II herebelow.

TABLE II

THE EFFICIENCY OF VARIOUS DEPOSIT RATE INCREASING ADDITIVES AT DIFFERENT CONCENTRATIONS

| Compound | % Weight Increase at Concentrations 0.2% | 0.4% | 0.2 to 0.4 % Increase |
|---|---|---|---|
| Phenol | 21.5 | 67.3 | 213 |
| 1-phenyl-2-thiourea | 22.7 | 60.0 | 164 |
| 5,5'-dimethyl hydantoin | 29.0 | 100.2 | 245 |
| 1,4-diphenyl-3-thiosemicarbazide | 32.4 | 88.8 | 174 |
| 2-amino-5-methyl-1,3,4-thiadiazole | 33.4 | 92.6 | 177 |
| N-phenyl thioglycolicacidamide | 34.8 | 179.4 | 415 |
| 2-mercapto-benzoxazole | 40.1 | 104.7 | 162 |
| 3-amino-5-mercapto-1,2,4-triazole | 59.4 | 139.4 | 135 |
| 2,2'-dipyridylamine | 60.5 | 80.2 | 33 |
| Acetyl acetone | 70.6 | 215.0 | 205 |
| Phloroglucinol | 87.5 | 171.6 | 96 |
| 5-amino-1,3,4-thiadiazole-2-thiol | 211.3 | 256.1 | 21 |
| 2,6-dimercaptopurine | 224.0 | 313.0 | 40 |
| Ethyleneglycol bis mercaptoacetate | 251 | 258.8 | 43 |
| 1H 1,2,4-triazole-3-thiol | 262.0 | 336.0 | 28 |
| 5-mercapto-3-phenyl-1,3,4-thiadiazole-2-thione | 265.0 | 318.5 | 20 |

The results in the above Table show that the greatest increase in rate with increase in concentration is given by the additives which show less than 80% initial increase. This is due to the fact that presence of an additive results in a lowering of the composition rupture voltage, the magnitude of which is dependant on the additive's activity and concentration. Thus, an additive concentration giving a rate increase of more than 200 to 250% is accompanied by varying degrees of water hydrolysis which results in reduced additive effectiveness at this and higher additive concentrations. Consequently, as already indicated above with reference to Example 1, the optimum concentration range is between 0.3 and 0.5% by weight depending on the activity of the additive.

EXAMPLE 3

A 5% acrylic electrocoating bath composition formulated from the commercial material Baycryl W460, a product of the Bayer company, having a pH of about 8.5 has been prepared and 0.2% and 0.5% by weight of acetyl acetone, with reference to the bath composition, were dissolved therein. Preweighed strips of 0.002-in. aluminum foil were immersed to a predetermined depth in the solution and at a predetermined distance from the cathode and electrocoated for 10 seconds each at both 120V and 150V. Each strip was then rinsed, cured for 30 minutes at 200° C, and reweighed after cooling. Two strips were coated for each additive and the average weight increase compared to an average of four control depositions carried out in the same bath but without additive. The following Table III gives the concentrations of the additive used and the percent weight increase over the controls, for each additive.

TABLE III

WEIGHT INCREASES CAUSED BY ACETYL ACETONE AT DIFFERENT CONCENTRATIONS TO THE -5% ACRYLIC SYSTEM

| % Concentration of Acetyl Acetone | % Weight Increase at 120V | 150V |
|---|---|---|
| 0.2 | 25.5 | 41.3 |
| 0.5 | 92.7 | 230.7 |

EXAMPLE 4

The procedure of Example 3 was repeated on a 10% acrylic electrocoating composition of about pH 7.7. The percent weight increase over the controls is summarized herebelow in Table IV.

TABLE IV

WEIGHT INCREASES CAUSED BY ACETYL ACETONE AT DIFFERENT CONCENTRATIONS TO THE 10% ACRYLIC SYSTEM

| % Concentration of Acetyl Acetone | % Weight Increase at 120V | 150V |
|---|---|---|
| 0.2 | 49.4 | 50.4 |
| 0.5 | 105.6 | 247.7 |

EXAMPLE 5

The procedure of Example 3 was repeated on a 6% alkyl electrocoating composition of about pH 7.4, formulated from the commercial material Arolon 369, a product of the Ashland Chemical Company, with the exception that the additive used was 1H 1,2,4-triazole-3-thiol. The percent weight increase over the controls is summarized herebelow in Table V.

TABLE V

WEIGHT INCREASES CAUSED BY 1H 1,2,4-TRIAZOLE-3-THIOL

| % Concentration of 1H 1,2,4-Triazole-3-Thiol | % Weight Increase at 120V | 150V |
|---|---|---|
| 0.2 | 59.6 | 32.8 |
| 0.5 | 57.1 | 29.6 |

It should be noted that the above non-limitative examples are in no way restrictive in nature and many modifications can be made by the man of the art without departing from the spirit and scope of the present invention. Thus, the same additives used with other resin systems such as styrene-acrylate, butadiene and the like, will give similar results, although the increases in the rate of deposition will vary to some extent. However, in all cases at least some increase will result. The additives are also not restricted to those enumerated above, but may include many other compounds of the formula already identified above or their salts, so long as they possess the required at least partial dissociation in the electrocoating bath composition and are capable of proton association in close vicinity of the anode of the electrocoating cell under conditions of operation. Obviously, the bath may also comprise a plurality of other additives which may be used to achieve various additional effects.

The principal advantage of using the additives described above is the shortening of the cell residence time for the substrate being coated and hence the achievement of higher line speeds, independently from other results or characteristics of the bath and also independently of the nature of further treatment of the substrate. It is believed that this represents an important advance in the art of electrocoating.

What is claimed is:

1. An electrocoating bath composition for depositing a coat of polymer material onto an anode, said bath composition comprising an essentially aqueous solution, emulsion or dispersion of said polymer suitable for electrodeposition on the anode when an electric current is passed therethrough, and comprising 0.01 to 2.0% by weight with reference to the bath composition of a compound of the general formulae:

$$X - R - X'$$

wherein
R is acyclic, saturated carbocyclic, unsaturated carbocyclic containing one C ring, heterocyclic, or carbocyclic and heterocyclic rings linked together through a ring atom or linked together through an acyclic saturated or unsaturated radical,
X is a phenolic or enolic —OH group, and
X' is a hydrogen atom or X,
said groups X being in such electronic configuration with reference to R that there is always a presence of labile protons therein under operative conditions of the electrocoating bath, or of a salt of said compound, said compound or its salt being in an at least partially disassociated state in said electrocoating bath composition and capable of proton association in close vicinity of the anode under conditions of operation.

2. Electrocoating bath composition according to claim 1, wherein said compound is used in a proportion of 0.3 to 0.5% by weight with reference to said bath composition.

3. Electrocoating bath composition according to claim 1, wherein said polymer is an electrodepositable synthetic polycarboxylic acid resin.

4. Electrocoating bath composition according to claim 1, wherein said polymer is an electrodepositable epoxy ester resin.

5. Electrocoating bath composition according to claim 1, wherein said polymer is an electrodepositable acrylic resin.

6. Electrocoating bath composition according to claim 1, wherein said polymer is an electrodepositable alkyd resin.

7. Electrocoating bath composition according to claim 1, wherein said compound is phenol.

8. Electrocoating bath composition according to claim 1, wherein said compound is acetyl acetone.

9. Electrocoating bath composition according to claim 1, wherein said compound is phloroglucinol.

10. An electrocoating process for depositing a coat of electrodepositable polymer material onto a conducting substrate acting as anode, which comprises: immersing said conducting substrate into an essentially aqueous electrocoating bath composition containing said polymer and containing 0.01 to 2.0% by weight with reference to the bath, of a compound of the general formulae:

X - R - X' wherein
R is acyclic, saturated carbocyclic, unsaturated carbocyclic containing one C ring, heterocyclic, or carbocyclic and heterocyclic rings linked together through a ring atom or linked together through an acyclic saturated or unsaturated radical,
X is a phenolic or enolic —OH group, and
X' is a hydrogen atom or X,
said groups X being in such electronic configuration with reference to R that there is always a presence of labile protons therein under operative conditions of the electrocoating bath, or of a salt of said compound, said compound or its salt being in an at least partially disassociated state in said electrocoating bath composition and capable of proton association in close vicinity of the anode under conditions of operation; and passing an electric current through said bath to effect desired deposition of said polymer onto said substrate; whereby due to the presence of said compound or its salt increased rate of polymer deposition onto the conductive substrate is achieved.

11. Process according to claim 10, wherein said conducting substrate acting as anode is passed continuously through said bath and is electrocoated in said bath in a continuous operation.

12. Process according to claim 10, wherein said conducting substrate acting as anode is of copper, aluminum or steel.

13. Electrocoating bath composition according to claim 1, wherein R is an acyclic radical.

14. Electrocoating bath composition according to claim 1, wherein R is a straight chain acyclic radical containing 1 to 12 carbon atoms and 0 to 3 heteroatoms.

15. Electrocoating bath composition according to claim 14, wherein R is an unsaturated straight chain acyclic radical.

16. Electrocoating bath composition according to claim 1, wherein R is a heterocyclic radical.

* * * * *